Oct. 30, 1934.  C. H. COLVIN  1,978,987
LIQUID LEVEL INDICATING DEVICE
Filed May 16, 1930   2 Sheets-Sheet 1

INVENTOR
Charles H. Colvin
BY
ATTORNEY

Oct. 30, 1934.　　　　C. H. COLVIN　　　　1,978,987
LIQUID LEVEL INDICATING DEVICE
Filed May 16, 1930　　　2 Sheets-Sheet 2
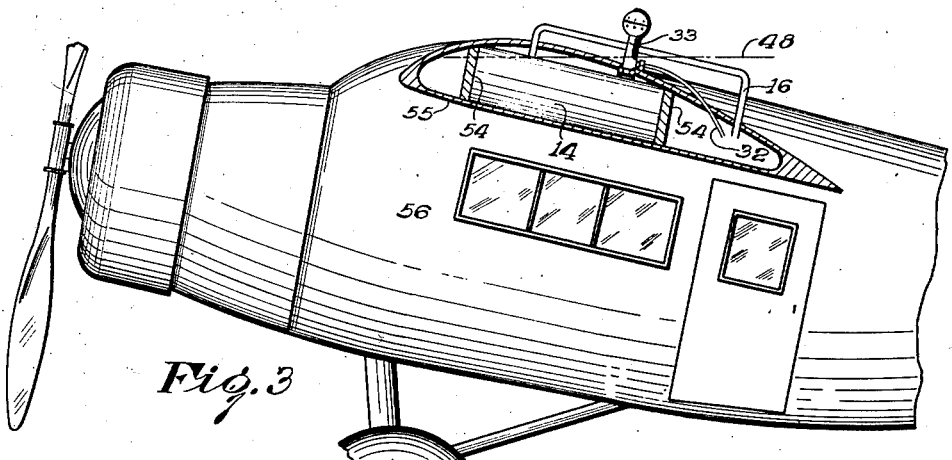
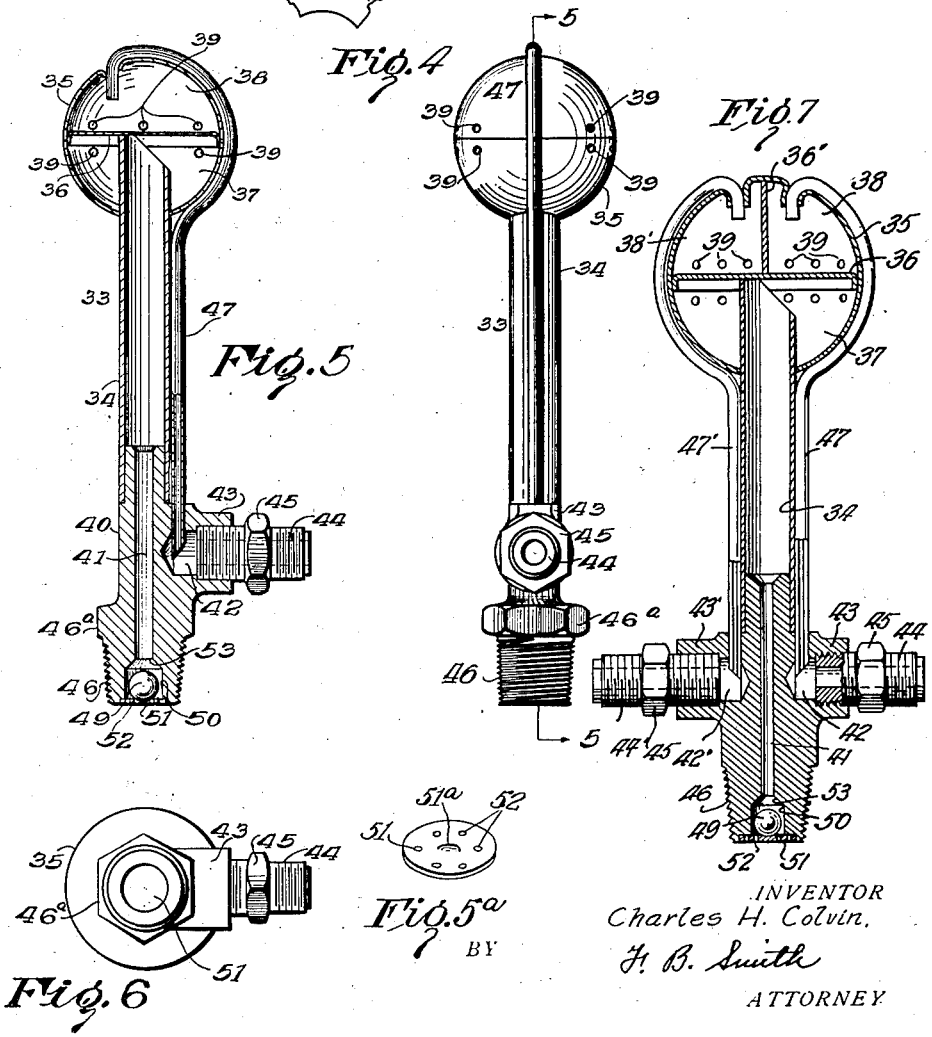
INVENTOR
Charles H. Colvin.
BY
H. B. Smith
ATTORNEY Patented Oct. 30, 1934

1,978,987

UNITED STATES PATENT OFFICE 1,978,987

LIQUID LEVEL INDICATING DEVICE

Charles H. Colvin, Brooklyn, N. Y., assignor to Pioneer Instrument Company, Incorporated, Brooklyn, N. Y., a corporation of New York Application May 16, 1930, Serial No. 453,053

16 Claims. (Cl. 73—54)

The present invention relates to indicating mechanism, and more particularly refers to novel means for use in indicating liquid levels whereby the quantity of a contained liquid may be accurately measured.

An object of the invention is to provide novel means, in combination with a liquid level indicating device, whereby the liquid, the level of which is to be measured, and the device are maintained at the same pressure.

Another object is to provide novel means, in combination with a liquid level indicating device, whereby the liquid which is to be measured is prevented from entering the device to hinder the operation thereof.

A further object is to provide novel means, in combination with a liquid level indicating device, whereby the liquid, the level of which is to be measured, is prevented from escaping from the supply tank when it is inverted and which normally permits proper venting of the tank.

A still further object is to provide novel means, in combination with a device of the class described, whereby the source of supply of the liquid and the device may be vented from a common point.

Still another object is to provide, as a new article of manufacture, a device of the class described adapted for use with a liquid fuel level indicating device on aircraft, automobiles and the like of the type described in Patents Nos. 1,711,506 and 1,711,507, issued to Morris M. Titterington, whereby proper venting of the source of fuel supply and the indicating device may be had at all times.

Other objects and advantages of the invention will appear more fully hereinafter from the following description taken together with the accompanying drawings which illustrate one embodiment of the invention. It is to be expressly understood, however, that the drawings are for purposes of illustration only and are not designed as a definition of the limits of the invention, reference being had for this purpose to the appended claims.

In the drawings, wherein like reference characters refer to like parts throughout the several views:

Fig. 3 is a plan view of a portion of an aircraft partially in section showing the location of the venting device with respect to the aircraft;

Fig. 4 is a front elevation of the venting device;

Fig. 5 is a sectional view of said venting device taken along the line 5—5 of Fig. 4;

Fig. 5a is a perspective view of an element of a check valve provided in the device;

Fig. 6 is a bottom view of Fig. 5; and

Fig. 7 is a sectional view of another form of venting device embodying the present invention.

Figure 1:
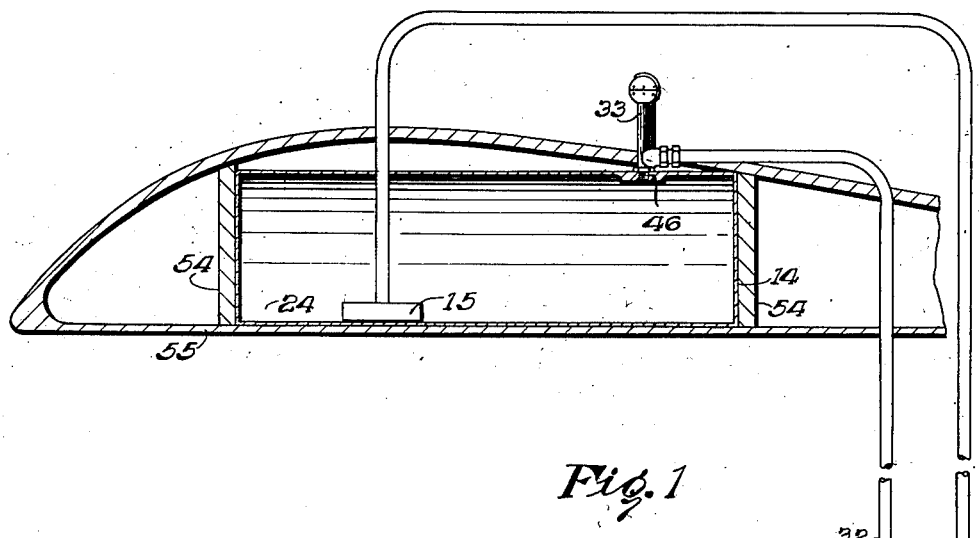
Fig. 1 illustrates a vertical section taken through the liquid level indicating device and a transverse section taken through the wing of an aircraft in which is located a supply tank and showing the connections between the tank, the venting device and the indicating device.
Figure 2:
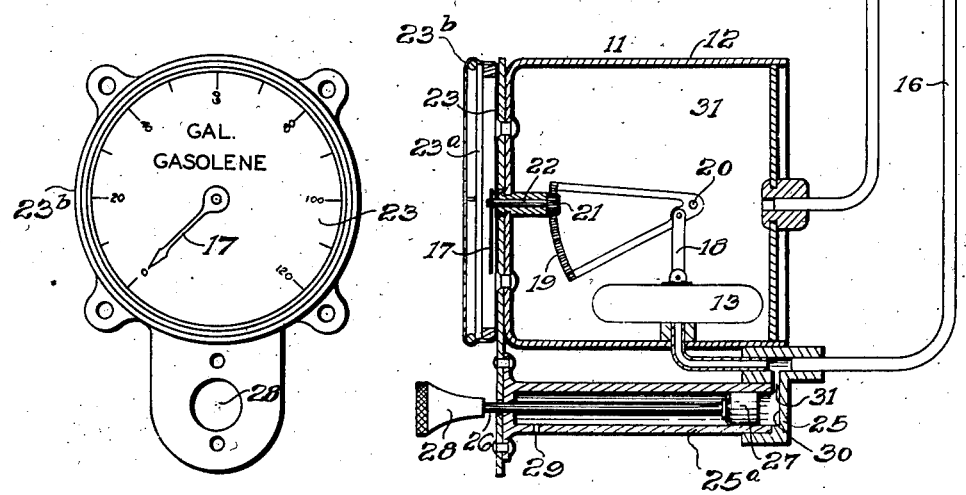
Fig. 2 is a front elevation of the indicating device.

Referring more particularly to Fig. 1 of the drawings, the liquid level indicating device or gauge 11 comprises a casing 12, a flexible chamber 13 which is responsive to pressures transmitted thereto from the tank 14 by means of the hydrostatic cell 15 and the pipe connection 16. Movements of the pressure responsive means or flexible chamber 13 are transmitted to a pointer 17 by means of the link 18 which is connected to the rack 19 pivotally mounted at 20 and adapted to mesh with the pinion 21, the latter being connected to the pointer 17 by means of shaft 22. Associated with the pointer 17 is a dial 23 for the purpose of giving indications of the level of the liquid 24 in the tank 14 in accordance with the hydrostatic head of the liquid. The pointer 17 and dial 23 may be covered by a disc 23a of some suitable transparent material preferably unbreakable such as celluloid and supported in a frame 23b.

Associated with the gauge 11 is a pump 25 which comprises a cylinder 25a and reciprocatively contained within the cylinder is a plunger or piston consisting of a piston rod 26 to one end of which is secured a flexible cup 27. At the end of rod 26, opposite from the flexible cup 27, is a knob 28 for the purpose of manually operating the pump. An opening 29 is provided in the cylinder for admitting air thereto on the forward stroke of the piston rod 26. Normally, flexible cup 27 abuts the end wall 30 thereby maintaining the passage 31 closed with respect to the cylinder 25a. The purpose and function of the pump 25 will be explained more fully hereinafter. The gauge and pump are adapted to be mounted on an instrument panel (not shown) of an aircraft, automobile and the like.

Chamber 31 of gauge 11 is connected by means of pipe 32 and venting device 33 to the tank 14.

The operation of the liquid level indicating device 11, as a simple hydrostatic gauge, is as follows:

Assuming that there is no liquid in the tank 14 and initially the system, including the tank, is full of air, then as liquid is poured into the tank, it rises in the hydrostatic cell 15 and compresses the air contained in the system in accordance with the hydrostatic head of the liquid. This pressure is then transmitted to the gauge through the pipe 16 and to the pressure responsive member or flexible chamber 13 which causes the actuation of the pointer 17 by means of the shaft 22, pinion 21 and rack 19. The dial 23 of the gauge may be calibrated so that it will indicate the level of the liquid in inches, gallons, pounds or some other function of pressure head as may be desired.

If the maintenance of a constant amount of air in the system could be assured, the gauge would continue to indicate the level of the liquid correctly at all times. However, it has been found that various factors contribute to making it difficult or practically impossible to maintain the air in the system without auxiliary means. Changes in temperature, changes in pressure, minute leaks and other factors tend to reduce the amount of air in the system and to thereby reduce the indication of the gauge and to render it undependable as a quantitative indicator of the liquid level. Means are therefore provided for replenishing the air in the system to compensate for loss due to the factors recited, said means comprising the pump 25.

The cooperative function of the pump 25 with the gauge 11 is as follows:

When it is desired to ascertain accurately the liquid level in tank 14, it is necessary to expel all liquid from the pipe 16 and cell 15. The piston rod 26 of the pump is therefore pulled forward in the cylinder 25a and then pushed back to its normal position so that the cup 27 abuts the wall 30. On the forward stroke of the rod 26, the flexible cup 27 permits flow of air around its periphery which is admitted into the cylinder through the opening 29, but on the return stroke, the cup expands against the walls of the cylinder and prevents the escape of air past it. The air is therefore delivered through passage 31, into the pipe 16 and is blown out of the bottom of the hydrostatic cell 15 thereby clearing the system of liquid. The indication of the gauge following this clearing of the pipe line 16 and cell 15 will be the correct level of the liquid in the tank.

Heretofore, when atmospheric pressures were used for operating the gauge with a tank, it had been the practice to merely leave the tank 14 and chamber 31 of the gauge 11 open to the atmosphere. Such an arrangement functioned satisfactorily when used on automobiles where the static pressures at the gauge and at the tank were substantially the same. However, in aircraft, such as airplanes, particularly planes provided with wing tanks, as illustrated in Fig. 1, considerable difficulty was experienced with hydrostatic gauges due to the differences in static pressure in the gasoline tank which is vented to the upper surface of the plane through the wing, and in the gauge which is generally located on the instrument panel in the cockpit of the plane. Therefore, a liquid level indicating gauge, such as a gasoline gauge, would indicate differently with the aircraft in flying position on the ground (i. e., the tail propped up to give the tank a true horizontal position for calibrating it) and with the aircraft in actual flight, due to vacuum being introduced into the tank produced by wind velocity at the upper surface of the plane when in flight. It is therefore essential that the gasoline gauge be vented to the same place as the tank. To this end, the present invention provides novel means for venting the gauge and the tank from a common point, said means comprising a device 33 illustrated in Figs. 4, 5 and 6, which consists of a tubular member 34 provided at one end thereof with a spherical portion 35 inside of which is located a partition 36 separating the interior of the spherical member 35 into two chambers 37 and 38 which are closed to each other, the latter being provided with apertures 39 adapted to communicate with the atmosphere surrounding it. The other end of the tubular member 34 is attached to, or made integral with, a cast coupling member 40 provided with a pair of separate passages 41 and 42. A boss 43 is provided extending from the side of the coupling member 40 and threaded internally for the reception of a pipe coupling 44 adapted to be locked to said boss 43 by means of the lock nut 45. The end of the cast member 40 is threaded externally at 46 and arranged to be screwed into the top of a container to be vented such as the tank 14 by means of the hexagonal portion 46a. Pipe coupling 44 is adapted for connection to a gauge, as indicated in Fig. 1, by means of pipe 32. Thus the coupling member 40 provides means affording a plurality of connections to the venting device 33. In order that the same pressure be transmitted to the gauge as to the tank, a tube 47 is provided, one end of which extends into the chamber 38 and the other into passage 42 which leads to the gauge through the pipe coupling 44. It will be readily apparent that whatever pressure may prevail in the vicinity of the spherical portion 35, it will be transmitted equally to the gauge 11 and to the tank 14 through the apertures 39 and the chambers 38, 37 and passages 42 and 41 respectively. The partition 36 is provided to prevent the liquid from siphoning from the tank to the gauge when the aircraft is in flight due to the inertia of the liquid and the acceleration of the craft or when the tank is full and not in a true horizontal position as indicated in Fig. 3 where the level of the liquid is indicated by the dot-dash line 48.

A further safety feature is provided in the venting device 33 in the form of a check valve to prevent gasoline escaping from the fuel tank of an airplane through said venting device when the plane is flying in inverted position or in case of turn-over of the plane in landing, which sometimes happens. The check valve consists of a ball 49 caged in a chamber 50 by means of a perforated washer 51 provided with perforations 52 arranged in circumferential relation in said washer. The ball 49 normally rests on the unperforated central portion 51a of the washer 51 thereby permitting venting of the fuel tank through the perforations 52. The central portion 51a is slightly concave to assure the seating of the ball 49 therein and preventing obstruction of the perforations. However, if the plane be in an inverted position, ball 49 is arranged to close passage 41 by falling into position against the entrance 53 of said passage thereby preventing gasoline from escaping from the tank.

As illustrated in Fig. 3, the venting device 33 is particularly adapted for use with aircraft and is shown connected to the tank 14 which is located between the struts 54 in a wing 55 of an airplane 56.

Although in the embodiment illustrated in

Figs. 1 to 6 of the drawings one form of the device is shown in use in combination with a wing tank of an airplane, it will be apparent to those skilled in the art that it is capable of use in combination with any container having a liquid therein, the level of which is to be indicated by a hydrostatic gauge located at a distance from the container, particularly in cases where there is a difference in pressure between the points at which the container and the gauge, respectively, are located. It will be further apparent from the foregoing that the interior of the spherical portion 35 of the venting device may be divided into more than two chambers, as shown in Fig. 7, and additional passages 42' and 47' may be provided for transmitting the pressure prevailing in the vicinity of the device to other apparatus for such purposes as may be desired. In this embodiment, the chambers 38 and 38' are separated by a vertical wall 36'. The chamber 38', like chamber 38, is connected by means of a pipe 47' to a passage 42' which may lead to another instrument or gauge through a pipe coupling 44' carried by a boss 43', said coupling 44' being provided with a locknut 45'. Therefore, reference will be had to the appended claims for a definition of the limits of the invention.

What is claimed is:

1. In combination with a fuel tank carried by an aircraft, a pressure responsive gauge remote from said tank and adapted to be mounted on the instrument panel of said aircraft for indicating the quantity of fuel in said tank in accordance with the pressure head of said fuel, said gauge including a casing, an indicator, a pressure responsive member in said casing, and means for actuating said indicator by movement of said pressure responsive member, said pressure responsive member having a connection with a hydrostatic cell immersed in the fuel in said tank whereby pressures corresponding to the height of the fuel are transmitted to said gauge, venting means carried by said tank and extending beyond the upper surface of said aircraft and comprising a member having a pair of chambers provided with apertures communicating with the atmosphere at said upper surface, and means for connecting one of said chambers with said fuel tank and the other chamber with said gauge for maintaining the fuel and the interior of said gauge casing at like pressures prevailing at said upper surface, a separating wall between said chambers for preventing the fuel from said tank from entering said gauge, and means adjacent said gauge casing for introducing air into the connection between the pressure responsive member and the hydrostatic cell whereby fuel which may be present in said connection may be cleared therefrom to eliminate excessive pressures so that a true reading may be obtained on said gauge.

2. In combination with a fuel tank carried by an aircraft, a pressure responsive gauge remote from said tank and adapted to be mounted on the instrument panel of said aircraft for indicating the quantity of fuel in said tank in accordance with the pressure head of said fuel, said gauge including a casing, an indicator, a pressure responsive diaphragm, and means for actuating said indicator by movement of said pressure responsive diaphragm, said diaphragm having a connection with a hydrostatic cell immersed in the fuel in said tank whereby pressures corresponding to the height of the fuel are transmitted to said diaphragm, venting means carried by said tank and extending beyond the upper surface of said aircraft and comprising a hollow member having a pair of chambers provided with apertures communicating with the atmosphere at said upper surface, and means for connecting one of said chambers with said fuel tank and the other chamber with said gauge for maintaining the fuel and the interior of the gauge casing at a common pressure prevailing at said upper surface, a separating wall between said chambers for preventing the fuel from entering said gauge from said tank, means adjacent the gauge casing for introducing air into the connection between the pressure responsive diaphragm and the hydrostatic cell whereby fuel which may be present in said connection may be cleared therefrom to eliminate excessive pressures so that a true reading may be obtained on said gauge, and means located between the tank chamber of said venting means and the tank for preventing the escape of fuel from said tank when the aircraft is inverted while permitting proper venting of said tank when the aircraft is in normal position.

3. In combination with a fuel tank, a pressure responsive gauge remote from said tank for indicating the quantity of fuel therein in accordance with the pressure head of said fuel, said gauge including a casing, an indicator, a pressure responsive diaphragm in said casing, and means for actuating said indicator by movement of said pressure responsive diaphragm, said diaphragm having a connection with a hydrostatic cell immersed in the fuel in said tank whereby pressures corresponding to the height of the fuel are transmitted to said pressure responsive diaphragm, venting means carried by said tank and comprising a hollow member having a pair of chambers provided with apertures communicating with the atmosphere, and means for connecting one of said chambers with said fuel tank and the other chamber with said gauge for maintaining the fuel and the interior of said gauge casing at equal pressures, a separating wall between said chambers for preventing the fuel from entering said gauge from said tank, means attached to the gauge casing for introducing air into the connection between the pressure responsive diaphragm and the hydrostatic cell whereby fuel which may be present in said connection may be cleared therefrom so that a true reading may be obtained on said gauge, and a check valve located between the tank chamber of said venting means and the tank for preventing the escape of fuel from said tank when it is inverted while permitting proper venting of the tank when it is in normal position.

4. In combination with a fuel tank, a pressure responsive gauge remote from said tank for indicating the quantity of fuel therein in accordance with the pressure head of said fuel, said gauge including a casing, an indicator, a pressure responsive member in said casing, and means for actuating said indicator by movement of said pressure responsive member, said pressure responsive member having a connection with a pressure member immersed in the fuel in said tank whereby pressures corresponding to the height of the fuel are transmitted to said gauge, venting means carried by said tank and comprising a member having a spherical portion including a pair of chambers provided with apertures communicating with the atmosphere, and means for connecting one of said chambers with said fuel tank and the other chamber with said gauge for maintaining the fuel and the interior of said gauge casing at a common pressure, a separating wall between said chambers for preventing the fuel from entering said gauge casing from the tank, and means located between the tank chamber of said venting means and the tank for preventing the escape of fuel from the tank when it is inverted while maintaining proper venting of the tank when it is in normal position, said means comprising a perforated disk and a ball cooperating therewith and adapted to close the communicating passage between the tank and its associated venting chamber.

5. In combination with a fuel tank, a pressure responsive gauge remote from said tank for indicating the quantity of fuel therein in accordance with the pressure head of said fuel, said gauge including a casing, an indicator, a pressure responsive member in said casing, and means for actuating said indicator by movement of said pressure responsive member, said member having a connection with a pressure device immersed in the fuel in said tank whereby pressures corresponding to the height of the fuel are transmitted to said gauge, venting means carried by said tank and comprising a member having a pair of chambers provided with apertures communicating with the atmosphere, and means for connecting one of said chambers with said fuel tank and the other chamber with said gauge for maintaining the fuel and the interior of said gauge casing at a common pressure, a separating wall between said chambers for preventing the fuel from entering said gauge from said tank, and means located between said chambers and the tank for preventing the escape of fuel from the tank when it is inverted while maintaining the proper venting of said tank when it is in normal position.

6. In combination with a fuel tank, a pressure responsive gauge remote from said tank for indicating the quantity of fuel therein in accordance with the pressure head of said fuel, said gauge including a casing, an indicator, a pressure responsive member in said casing, and means for actuating said indicator by movement of said pressure responsive member, said member having a connection with a pressure device immersed in the fuel in said tank whereby pressures corresponding to the height of the fuel are transmitted to said gauge, and venting means carried by said tank and comprising a member having a pair of chambers provided with apertures communicating with the atmosphere, and means for connecting one of said chambers with said fuel tank and the other chamber with said gauge for maintaining the fuel and the interior of said gauge casing at a common pressure, and a separating wall between said chambers for preventing the fuel from entering said gauge from said tank.

7. In combination with a fuel tank, a pressure responsive gauge remote from said tank for indicating the quantity of fuel therein, said gauge including a casing, an indicator, a pressure responsive member in said casing, and means for actuating said indicator by movement of said member, said member having a connection with a pressure device immersed in the fuel in said tank whereby pressures corresponding to the height of the level of said fuel are transmitted to said gauge, and venting means associated with said tank and comprising a member having a plurality of chambers one of which is connected with said gauge casing and the other of which is connected to the tank, said chambers being provided with apertures communicating with the atmosphere so that the interior of the gauge casing and of the tank may be maintained at like pressures.

8. In combination with a container having a liquid therein and adapted to be subjected to other pressures in addition to the pressure head of the liquid, a pressure responsive device for indicating the true level of said liquid in said container in accordance with the pressure head of said liquid, said device including a casing, a pressure responsive member in said casing and having a connection with a pressure device in said container, and a single venting member having connections to said container and the casing of said pressure responsive device, said member so having apertures placing the interior thereof in communication with the atmosphere for maintaining the liquid in said container and the interior of said casing at like pressures so that the effect of pressures other than that due to the pressure head of the liquid is eliminated.

9. In combination with a container adapted to hold a liquid therein, pressure responsive means for indicating the true level of a liquid in said container, and a single venting member having connections to said container and said indicating means and having apertures placing the interior of said member in communication with the atmosphere for maintaining the interior of said container and of said pressure responsive means at like pressures so that the effect on said pressure responsive means of pressure other than that due to the pressure head of the liquid is eliminated, said venting means including means for preventing the liquid from escaping from said container when it is inverted while permitting communication of said container with the atmosphere when said container is in normal position.

10. In combination with a container adapted to hold a liquid therein and subjected to other pressures in addition to the pressure head of the liquid, pressure responsive means for indicating the true level of a liquid in said container, and means connected to said container and said indicating means and having a connection with the atmosphere for maintaining the interior of said container and said indicating means at the same pressure so that the effect on said pressure responsive means of pressures other than that due to the pressure of the liquid is eliminated, said means including means for preventing a liquid from said container from entering said indicating means.

11. In combination with a container having a liquid therein and adapted to be subjected to other pressures in addition to the pressure head of the liquid, means for indicating the level of said liquid, and a unitary venting member having its interior connected to said container and said indicating means and also having its interior in communication with the atmosphere for maintaining said liquid and said indicating means at like pressures and for providing a vent for said container so that the effect of pressures other than that due to the pressure head of the liquid is eliminated.

12. As a new article of manufacture, a venting device for containers adapted to hold a liquid and comprising a member having a plurality of chambers provided with apertures, means affording a plurality of connections to said device, said chambers having passages communicating with each of said connections.

13. A device of the class described comprising a member having a plurality of chambers provided with apertures, means affording a plurality of connections to said device, means affording communication between each of said chambers and said connections respectively, and means separating said chambers whereby each of said chambers is closed to an adjacent chamber.

14. A device of the class described comprising a member having a plurality of chambers provided with apertures, means affording a plurality of connections to said device, means affording communication between each of said chambers and said connections respectively, separating means between said chambers whereby each of said chambers is closed to an adjacent chamber, and means associated with the connecting means of one of said chambers and adapted to close communication between said chamber and its respective connection and normally in open position.

15. A device of the class described comprising a tubular member having means at one end thereof affording a plurality of connections to said device, means at the other end of said tubular member comprising a pair of chambers provided with apertures adapted to communicate with the atmosphere, a separating wall between said chambers whereby each of said chambers is closed to the other, said chambers having passages communicating with said connections, and means constituting a check valve adapted to close the passage between one of said chambers and its associated connection.

16. A device of the class described comprising a tubular member having a substantially spherical portion forming two separate chambers closed to each other, means at the other end of said tubular member affording a plurality of connections to said device, said chambers being provided with apertures adapted to communicate with the atmosphere and further provided with separate passages communicating with each of said connections, and means comprising a perforated disk positioned in one of said passages and a ball supported by said disk but leaving the perforations in said disk unobstructed and adapted to close said passage when the device is inverted whereby the associated connection is closed.

CHARLES H. COLVIN.